Patented Oct. 11, 1938

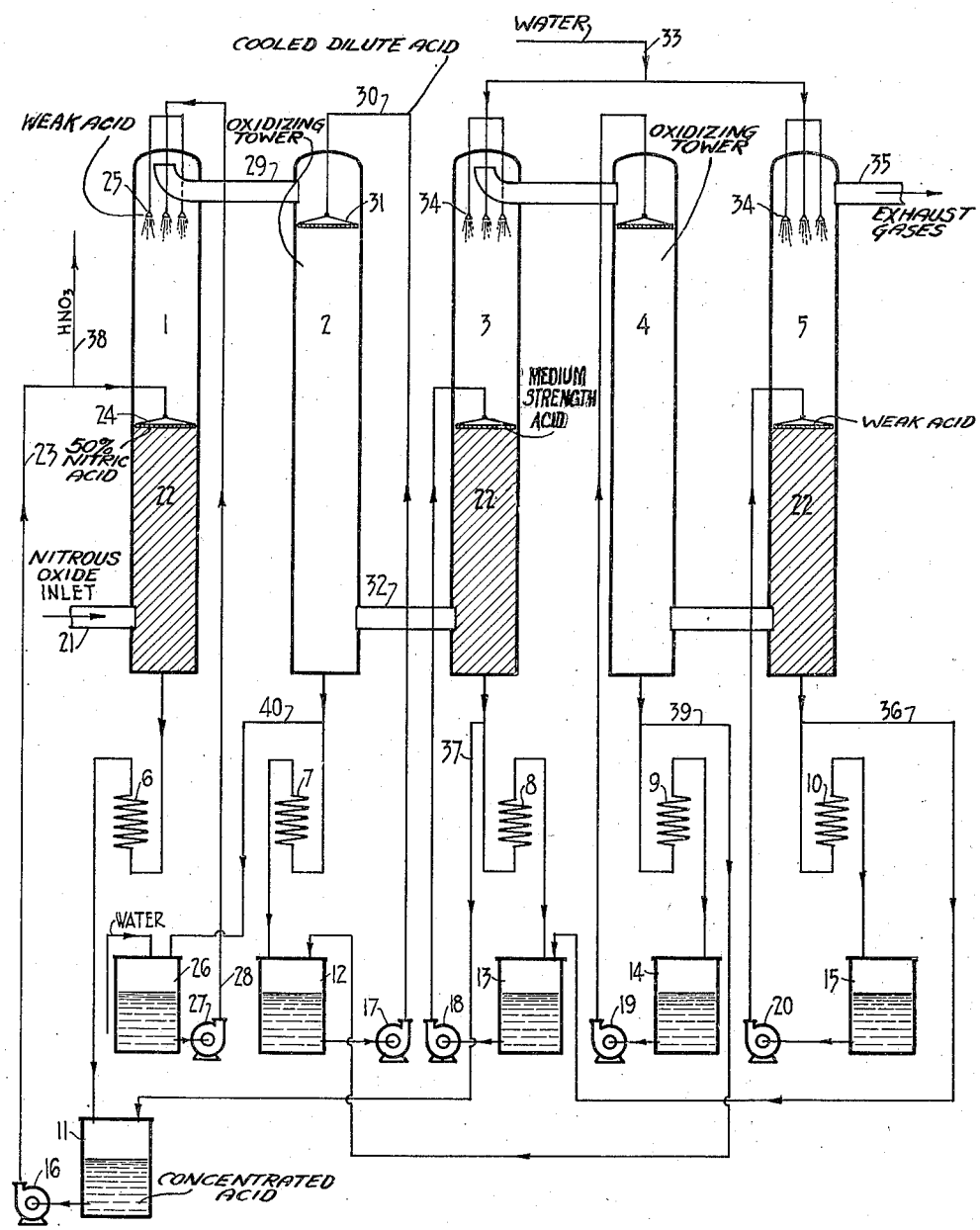

2,132,663

UNITED STATES PATENT OFFICE 2,132,663

PROCESS FOR THE PRODUCTION OF NITRIC ACID

Maarten Voogd, Pittsburg, Calif., assignor to Shell Development Company, San Francisco, Calif., a corporation of Delaware Application February 15, 1937, Serial No. 125,682
In Great Britain February 27, 1936

2 Claims. (Cl. 23—160)

This invention relates to the production of nitric acid from nitrous gases, more particularly the gases containing nitrogen oxides obtained by the catalytic oxidation of ammonia.

The usual process for producing nitric acid from nitrous gases, such as those obtained by ammonia oxidation, consists in the gases, after having been oxidized to convert the greater part of the nitric oxide into nitrogen peroxide, being brought in contact in a series of packed absorption towers or absorption vessels with aqueous nitric acid. The concentration of the acid circulating through each tower is lower than in the preceding one. In this way the gases with the highest concentration of nitrogen oxides are contacted with the strongest acid.

During the conversion of the nitrogen oxides into nitric acid the following two reactions occur simultaneously, but independently of each:

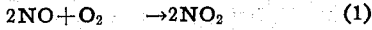
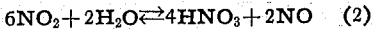

$$2NO + O_2 \rightarrow 2NO_2 \quad (1)$$
$$6NO_2 + 2H_2O \rightleftharpoons 4HNO_3 + 2NO \quad (2)$$

The first of these reactions, consisting in the oxidation of nitric oxide to nitrogen peroxide is a time reaction, which at first proceeds rather quckly, but with decreasing nitric oxide concentrations rapidly decreases in velocity. The second, the formation of nitric acid is an equilibrium reaction governed by the temperature and the nitric acid concentration of the absorption liquid. The latter reaction results in ⅓ of the nitrogen peroxide involved in the formation of nitric acid being reduced to nitric oxide, which again must be oxidized. It is due to this circumstance that a rather long time is required for a more or less complete removal of the nitric oxide from the gas mixture.

Another disturbing factor resides in the fact that during the contact of the gases with the absorption acid the equilibrium according to the above Equation 2 tends to establish itself, which implies that at a given temperature there will be for any given acid concentration a certain proportion of nitric oxide and nitrogen peroxide in the gas phase. Therefore there will remain in the gas leaving the absorber a certain amount of nitrogen peroxide, which could not be converted into nitric acid in this absorber. In the next absorber, in which a more dilute acid is circulated, the nitrogen peroxide concentration will be reduced, but only to an extent corresponding to the equilibrium conditions prevailing in this absorber. This effect is the more pronounced according as the absorbing acids are more concentrated, so that the gases, after having been contacted with these acids, still show very high concentrations of nitrogen peroxide, even though the concentration of the nitric acid finally obtained be only about 50%.

Assuming that the absorption treatment is carried out in countercurrent, as is practically always the case, the nitric acid content of the absorbing medium moving in one direction will gradually increase and the gases moving in the reverse direction will gradually decrease in concentration of nitrogen oxides. In those parts of the absorption system where the higher acid concentrations are present (i. e. those parts closest to the point of introduction of the gases), an excess of nitrogen peroxide will, in view of the above equilibrium, remain in the gases and will mostly pass unchanged, its conversion into nitric acid only taking place in those parts of the absorption system where the liquid has a lower acid concentration. As a result of the very limited absorption of nitrogen peroxide in the first parts of the absorption system only very small amounts of nitric oxide are reformed therein according to the above Reaction 2 and this nitric oxide, being in quite a dilute state in the excess of unconverted nitrogen peroxide, provided the gases had been oxidized to a high degree before entering the absorption system, will not be re-oxidized to any appreciable extent, so that the said parts of the system are practically unavailable for the re-oxidation reaction. Such re-oxidation of nitric oxide can only take place in that part of the system where low acid concentrations prevail. With a view to carrying out this re-oxidation, which proceeds rather slowly, the nitric oxide concentrations still being low, the last part of the absorption system is required to have disproportionately large dimensions, which constitutes a serious drawback, the cost of the absorption system being by far the most important factor in the nitric acid manufacture.

In practice the acid absorption of nitrous gases is generally carried out in a series of packed absorption towers or other vessels, each of which is provided with an acid circulation system, the absorption being effected by leading the gases through the system in countercurrent to the absorbing liquid which overflows from one absorber to the preceding one. Water or dilute acid is supplied to the last tower in such amounts that strong acid of about 50% concentration or higher can be withdrawn from the first tower. With such a system the drawback referred to above is seriously felt, because in the first two or three towers the degree of oxidation, i. e. the ratio of nitrogen peroxide to nitric oxide is found to be very high which implies that a considerable part of the nitrogen peroxide is only absorbed with regeneration of nitric oxide in the middle and last towers and necessitates the application of absorption towers of a very large size, unless the gases are allowed to leave the system with too high a content of nitrogen oxides.

According to the present invention it has now been found that the disadvantage described above can be overcome by bringing the nitrous gases, after each absorption treatment with strong or relatively strong acid, into contact, preferably in countercurrent, with water or dilute acid, preferably in a finely divided, e. g. atomized form, or with steam, and subsequently subjecting the gases, which are now substantially free from nitrogen peroxide to oxidation for the re-oxidation of the nitric oxide formed.

The process according to the invention thus comprises the following three distinct phases. First the nitrous gases—which in the event that they originate from the combustion of ammonia are previously cooled and oxidized—are contacted with nitric acid of elevated or relatively elevated concentration, whereby the gases and the liquids tend to reach the absorption equilibrium according to Equation 2 and the gases treated, for the reason set forth above, possess a very high degree of oxidation, that is to say consists primarily of nitrogen peroxide. In the second phase the gases issuing from this absorption are brought in intimate contact with an amount of water (either in the liquid state or in the form of steam) or dilute nitric acid, which water or dilute acid will after contact be in equilibrium with a nitrogen peroxide concentration in the gas=O, or a concentration practically corresponding to this value. This intimate contact is advantageously brought about by atomizing or pulverizing the water or dilute acid into the gases, preferably in countercurrent, and, owing to the very rapid attainment of the equilibrium, results in a practically complete conversion of the nitrogen peroxide into nitric acid in the finely divided liquid within an exceedingly short period of time. The third phase consists in an oxidation treatment of the resulting gases, practically free from nitrogen peroxide, whereby their nitric oxide content is re-oxidized, which treatment is preferably combined with a withdrawal of oxidation heat and possibly with a certain amount of absorption. This sequence of operations can be carried out two, three or more times in succession.

In order to attain, with the process according to the invention, the normal concentration of production acid, that is to say at least about 50%, it will be clear that the amount of water employed in the second phase may not exceed that supplied in the usual absorption processes. When starting from nitrous gases obtained by oxidation of ammonia the absorbing liquid supplied in the absorption system partly consists of the condensate obtained by cooling of the hot gases leaving the ammonia oxidizers. It was found that a total amount of condensate and additional water not exceeding the normally supplied quantity is amply sufficient to remove nearly quantitatively the nitrogen peroxide from the gases, provided an intimate contact is employed, e. g. by atomizing. It is further desirable, by a proper regulation of the cooling of the ammonia oxidation gases, to ensure that the condensate becomes available as completely as possible and also with a minimum content of nitric acid. For the purposes of the invention the condensate should preferably be obtained in the form of substantially pure water.

Although the washing out of the nitrogen peroxide from the gases which have been in contact with the concentrated or relatively concentrated acid can be effected at normal temperature, it can also be carried out at somewhat elevated temperatures, which are insofar beneficial as they accelerate the nitric acid formation. The working at somewhat elevated temperatures can, for example, be effected by introducing steam instead of water into the gases.

From the above it will be clear that the phase in which the gases are contacted with concentrated acid is immediately followed by a phase where the gases are almost entirely freed of their nitrogen peroxide content so that in the first parts of the absorption system the major part of the nitric oxide is regenerated and can readily be re-oxidized. Owing to this a considerable advantage is attained as compared with the known absorption processes, viz., that for a given absorption capacity a system of materially reduced size, involving appreciably lower investment costs, can be resorted to or for a given absorption system the capacity can be considerably increased.

The accompanying drawing illustrates by way of example, a diagrammatic sketch of apparatus suitable for carrying out the invention where applied to nitrous gases resulting from the catalytic oxidation of ammonia.

Referring to the drawing, the absorption system comprises a number of towers 1, 2, 3, 4 and 5, each of which is provided with an acid recirculation system comprising respectively, coolers 6, 7, 8, 9 and 10, receiving tanks 11, 12, 13, 14, 15 and pumps 16, 17, 18, 19 and 20.

The oxidized nitrous gases leaving the usual converter, enter tower 1 through an inlet pipe 21 situated near the bottom of the tower. The half of this tower and the succeeding towers 3 and 5 are packed with suitable packing material such as raschig rings or porcelain chips 22. The nitrous gases rising through the lower portion of the tower are met by a downward flowing stream of nitric acid of about 50% concentration introduced through line 23 and distributed evenly across the packing by means of distribution plate 24.

The upward moving gas stream is thereafter in the upper unpacked part of the tower 1 contacted with dilute acid introduced in a fine divided form by means of atomizing device 25. This dilute acid is fed from tank 26 by pump 27 through pipe 28 and consists of a mixture of water and acid withdrawn from the bottom of tower 2 as will hereinafter be explained.

The acid concentration of this atomized dilute acid is considerably increased by the absorption of the nitrogen peroxide from the gas stream. The acid mixes with the strong acid introduced at the middle of the tower and is withdrawn together with the circulating acid from the bottom of tower 1. The gas stream consisting mainly of nitric oxide leaves tower 1 through conduit 29 and enters tower 2 where re-oxidation can take place. No packing is contained in towers 2 and 4 in order that the time reaction $2NO+O_2 \rightarrow 2NO_2$ can take place more readily. By means of pipe 30 and distributor plate 31 some cooled dilute acid is introduced in the top of the tower 2 and some slight absorption may take place. From tower 2 the gas stream now containing more nitrogen peroxide passes into the bottom of tower 3 through conduit 32. This tower is of the same construction as tower 1 and is provided with a similar acid circulation system. In the upper unpacked part of the tower the nitrogen peroxide of the gas stream is washed out by means of water supplied through line 33 and introduced into the upper part of the tower by means of atomizing devices 34. The processes taking place in tower 3 are similar to those in tower 1 while the next tower 4 again functions as an oxidation space. The last tower 5 is again divided into a lower absorption space and an upper scrubbing space, the jetting or atomizing devices 34 in the latter being also fed with water supplied through line 33. The gases leaving tower 5 at 35 contain only traces of nitric oxide which can if desired be recovered by an alkaline absorption treatment.

Part of the acid produced in tower 5 flows through line 36 to tank 13 and part of the acid withdrawn at the bottom of tower 3 is conducted by means of line 37 to tank 11. The acid produced by the absorption is continuously led off through line 38. Part of the dilute acid removed from tower 4 is continuously led to tank 12 of tower 2 by line 39. The acid produced in tower 2 is in turn conducted to tank 26 by line 40 and forms part of the spray used in the upper part of tower 1.

It is to be understood that the invention is by no means restricted to the process described above. Many modifications can be made without departing from the principle of the present invention. For example, instead of repeating the sequence of operations three times in succession as above described, it may also be carried out only twice. Further instead of effecting the contact of the gases with the water or dilute acid in the upper part of an absorption tower, it may also be brought about in the tube connecting the tower with the oxidation tower. This modification has the advantage that owing to the smaller diameter of the tube as compared to that of the absorption tower a more efficient contact of the gases with the liquid can be obtained.

In order to attain a satisfactory scrubbing of the nitrogen peroxide from the gases it is essential that at the place where liquid is atomized a uniform gas stream should prevail over the entire cross-section of the tower. Especially with towers of relatively large diameter this may necessitate special provisions consisting for example, in a transverse perforated plate being provided in the tower at a level just below the outlet tube for the gases and above the lower end of the jetting or atomizing device or in the said outlet tube being prolonged and bent upward in the upper part of the absorption tower.

The process above described is not limited to the absorption of streams of nitrogen oxides produced by the oxidation of ammonia but may be applied to the absorption of nitrogen oxides produced by other means for example by subjecting air to treatment in an electric arc and, while normally conducted at approximately atmospheric pressure the process may, if desired, be conducted under superatmospheric pressure.

I claim as my invention:

1. In a process for producing nitric acid of high concentrations from gaseous streams containing nitrogen oxides, the steps of absorbing nitrogen peroxide from the gaseous stream with strong nitric acid, next scrubbing the remaining gases with weak nitric acid, next oxidizing the nitric oxide of the gaseous stream, then absorbing with medium strength nitric acid the nitrogen peroxide formed by the oxidation of said nitric oxide, thereafter scrubbing the remaining gases with water.

2. In a process for producing nitric acid of high concentrations from gaseous streams containing nitrogen oxides, the steps of absorbing nitrogen peroxide from the gaseous stream with strong nitric acid, next scrubbing the remaining gases with weak nitric acid, next oxidizing the nitric oxide of the gaseous stream, then absorbing the nitrogen oxide formed in the foregoing oxidation step with nitric acid having a concentration weaker than that of the nitric acid used in the first step but stronger than that of the nitric acid used in the second step, thereafter scrubbing the remaining gases with water.

MAARTEN VOOGD.